Patented Sept. 10, 1946

2,407,279

UNITED STATES PATENT OFFICE 2,407,279

METHOD FOR THE PREPARATION OF NEUTRAL ESTERS OF PHOSPHORIC ACID

David C. Hull and Jerry R. Snodgrass, Kingsport, Tenn., assignors to Eastman Kodak Company, Rochester, N. Y., a corporation of New Jersey No Drawing. Application December 8, 1943, Serial No. 513,472

12 Claims. (Cl. 260—461)

This application relates to the preparation of neutral esters of phosphoric acid by reacting $P_2O_5$ with an ether at a temperature of 65° C.–180° C.

Of late years the neutral esters of phosphoric acid have been found to be useful for many purposes, such as plasticizers, spinning lubricants, etc. Some of the more commonly known members of this class are triphenyl phosphate, tricresyl phosphate, triethyl phosphate and tributyl phosphate. Up to now the commonly employed method for preparing these esters has been by the action of phosphorous oxy-chloride and an alcohol or phenol, resulting in the formation of hydrochloric acid. There have been many patents issued relating to modifications of this reaction in order to prevent side reactions caused by the liberated hydrochloric acid. As a consequence the yields have been low and the method has been expensive. The reaction of $P_2O_5$ and alcohol has also been suggested but this reaction has never found commercial application due to the other reactions which occur so that the resulting product has contained mainly other materials than the neutral ester of phosphoric acid.

One object of our invention is to provide a process of preparing neutral esters of phosphoric acid without the disadvantages connected with prior processes which have been employed. Other objects will appear hereinafter.

We have found that by using an elevated temperature, $P_2O_5$ and an ether will react to form a neutral ester of phosphoric acid, and thereby good yields of the phosphoric acid esters will be obtained, less expensive starting materials may be employed, the phosphates are produced in a more pure state and the expensive purifying procedures necessary with other processes are not necessary in refining the phosphoric acid ester produced in accordance with our invention. The products obtained in accordance with our process are trialkyl or triaryl phosphates. In the making of these esters using phosphorous oxy-chloride an expensive purifying procedure is necessary to isolate the triaryl or trialkyl phosphate obtained. With the product in accordance with our invention the product obtained is sufficiently pure after vacuum distillation to be suitable for most purposes in which the product is employed.

In accordance with our invention $P_2O_5$ and an ether are mixed together in a well agitated reaction vessel and heated to a temperature of 65° C.–180° C. Temperatures above 180° C. tend to cause decomposition products and excessive pressure in the reaction vessel. The reaction is preferably carried out in an autoclave, within which pressure develops. However, as far as we have been able to ascertain, the building up of a high pressure does not facilitate the reaction but results from the use of elevated temperatures when a low boiling ether is used, this being a feature which promotes the formation of the trialkyl or triaryl phosphate. If desired, instead of using an autoclave a vessel may be employed which returns the vapors given off to the reaction vessel if the boiling point of the ether is high enough to promote the reaction. However, as the ethers are ordinarily characterized by low boiling points, such a method is not generally feasible.

The reaction in accordance with our invention may be carried out either in the presence or the absence of an esterification catalyst. We have found, however, that when a catalyst is employed the yields are ordinarily greater and, therefore, the presence of a catalyst in the reaction mass is preferred.

The ethers which may be employed are those of ethyl, normal propyl or, for that matter, any of the alkyl or mixed alkyl ethers or the aryl ethers. For example, some of the ethers which may be employed are ethyl ether, n-propyl ether, diphenyl ether, dicresyl ether, methyl ethyl ether, isobutyl ether and the like. Better results have been obtained when the ether is anhydrous, although processes have been satisfactorily carried out using ordinary commercial ethyl ether in which ethyl alcohol and moisture were present in a small amount. It is also preferred that the $P_2O_5$ which is employed has not been exposed to the moisture of the air to any appreciable extent to obtain the best results in the reaction.

Although the temperature may range from 65° C.–180° C., we have found that temperatures within the range of 140° C.–180° C. are quite suitable for carrying out the reaction and there is no reason in ordinary practice to depart from this range of temperature.

The highest yields have been obtained in accordance with our process where the residue from a previous batch has been mixed in with the reaction ingredients and again reacted. This procedure aids in recovering additional phosphoric acid ester from that residue. If desired, a residue from the vacuum distillation to remove the triethyl phosphate may be mixed with ether and processed without adding new $P_2O_5$. The yields of triethyl phosphate are greatly increased by this procedure; yields up to 80% or higher being obtained thereby. The percentage of yield is based upon the amount of $P_2O_5$ employed. The ether is used in excess of the theoretical quantity. Ordinarily the amount of ether should be at least two times the molar amount of $P_2O_5$, and preferably may be as much as eight or ten times or even more. As the ether is easily removed at a low temperature, this excess is easily recovered when separating the phosphoric acid ester from the other constituents of the reaction mass. The ether employed is not only a reactant but also serves as a solvent in the mass, and when present in excess of theoretical facilitates agitation of the reactants and thereby inhibits side reactions and decomposition at the temperatures ordinarily employed in obtaining the best yields.

The examples illustrate a number of various esterification catalysts which have been found to be suitable for promoting the reaction. These examples illustrate that esterification catalysts generally are useful for promoting the reaction as described in the application. The following examples illustrate the preparation of neutral esters of phosphoric acid in accordance with our invention. After the product is prepared it is refined by vacuum distillation. If desired, solvent extraction may be employed instead of or in addition to the vacuum distillation. It is important that the vacuum distillation should be carried out at a restricted temperature such as less than 170° C. and a low enough pressure to recover all of the phosphate ester at or below this temperature without undesirable decomposition in order to obtain the best yield of product. If further refinement is desired, the phosphate may be purified in accordance with any of the methods ordinarily described in the prior art for the purification of triethyl phosphate, triphenyl phosphate or esters of like nature.

Example 1

400 grams of anhydrous diphenyl ether and 50 grams of $P_2O_5$ was added to a well agitated stainless steel autoclave, the $P_2O_5$ was protected from the moisture of the air and the diphenyl ether was dry. The temperature of the mass in the autoclave was gradually raised to 140° C. and was maintained between 130° C. and 150° C. The mass was allowed to stand overnight or about ten hours. The triphenyl phosphate was separated from the reaction mass by vacuum distillation (5 mm. of mercury pressure) in an ordinary Claisen flask. A yield of 28.8% of triphenyl phosphate was obtained based on the $P_2O_5$ used.

Example 2

A stainless steel autoclave which is well agitated, was charged with a mixture of 300 grams of anhydrous diethyl ether, 100 grams of $P_2O_5$ and 2 grams of iodine (the latter being added to aid in promoting the reaction). The temperature was raised to 109° C. and was held within the limits of 100° C. to 150° C. for approximately five hours. The excess ether was removed at atmospheric pressure and the remainder of the mass was vacuum distilled (7 mm. of mercury pressure) thus separating the triethyl phosphate formed in the reaction. A 42.5% yield of triethyl phosphate was obtained based on the amount of $P_2O_5$ used.

Example 3

A mixture of 269 grams of anhydrous diethyl ether, 100 grams of $P_2O_5$ and 2 grams of cobaltous acetate were mixed together in a well-agitated autoclave and the temperature was raised to 112° C. in two hours and was allowed to proceed to a maximum of 175° C., the reaction being allowed to continue for twelve hours. The triethyl phosphate was separated from the mass by vacuum distillation and a 30% yield was obtained based on the $P_2O_5$.

Example 4

A well-agitated autoclave was charged with a mixture of 117 grams of $P_2O_5$, 240 grams of anhydrous diethyl ether and 1 gram of potassium ferrocyanide. In one hour the temperature was increased to 93° C. and was allowed to proceed to a maximum temperature of 150° C., the triethyl phosphate formed was recovered and purified in the usual manner. A 36.5% yield was obtained based on the $P_2O_5$.

Example 5

A well-agitated autoclave was charged with 240 grams of anhydrous diethyl ether, 108 grams of $P_2O_5$ and 1 gram of sodium nitroprusside. The temperature was elevated to 75° C. initially, finally reaching a temperature of 150° C. The triethyl phosphate formed was recovered and purified in the usual manner. A 39.7% yield of triethyl phosphate was obtained based on the $P_2O_5$.

Example 6

A well-agitated autoclave was charged with a mixture of 100 grams of $P_2O_5$, 230 grams of anhydrous diethyl ether and 2 grams of ferric chloride. The temperature was raised to 133° C., reaching a maximum of 148° C. After a period of five hours the mass was cooled and vented and was reheated for one-half hour at 145° C. The triethyl phosphate formed was recovered and purified in the usual manner. A 42% yield of triethyl phosphate was obtained based on the $P_2O_5$.

Example 7

The autoclave which is well agitated, was charged with a mixture of 100 grams of $P_2O_5$, 300 grams of diethyl ether and 2 grams of zinc chloride. The temperature was raised and maintained between 134 and 144° C. for four hours. A 50.4% yield of triethyl phosphate was obtained, based on the $P_2O_5$.

Example 8

A well-agitated autoclave was charged with a mixture of 102 grams of $P_2O_5$, 350 grams of anhydrous diethyl ether and 3 cc. of concentrated sulfuric acid. The mass was heated to 87° C. and then to a maximum temperature within the range of 130 to 137° C. for 5 hours. A 48.5% yield of triethyl phosphate was obtained based on the $P_2O_5$.

Example 9

A well-agitated autoclave was charged with a mixture of 300 grams of anhydrous diethyl ether, 75 grams of $P_2O_5$, 2 grams of phosphoric acid and 2 grams of diphenyl ether. The mass was heated and maintained at a range of 130 to 160° C. for an eight hour period. A 59.5% yield of triethyl phosphate was obtained based upon the $P_2O_5$ used.

Example 10

A well-agitated autoclave was charged with a mixture consisting of 300 grams of ethyl ether, 76 grams of $P_2O_5$ and 2 cc. of phosphoric acid. The mass was subjected to temperatures on the order of 140° C. to 150° C. for 16 hours. A 56% yield of triethyl phosphate was obtained based on the P₂O₅ used.

Example 11

A well-agitated autoclave was charged with a mixture of 77 grams of P₂O₅, 300 grams of diethyl ether, 2 cc. of phosphoric acid and 85 grams of the residue obtained from a similar previous batch from which the triethyl phosphate had been distilled. The mass was heated for a period of 7 hours at a temperature of 125° C.–144° C. A 76.7% yield of triethyl phosphate was obtained based on the P₂O₅ used.

Example 12

A well-agitated autoclave was charged with a mixture consisting of 85 grams of the residue obtained in the procedure according to Example 10, 300 grams of anhydrous diethyl ether and 77 grams of P₂O₅ and 2 cc. of phosphoric acid. The mass was heated to a maximum of 146° C., was allowed to stand over night and was then heated up again to a maximum temperature of 150° C. A 75% yield of triethyl phosphate was obtained.

Example 13

A well-agitated autoclave was charged with a mixture of 71 grams of P₂O₅, 300 grams of commercial ethyl ether (containing some water and ethyl alcohol) and 2 cc. of phosphoric acid. The mass was heated to a temperature between 140° C. and 150° C. and maintained at that temperature for about 15 hours. A 49.5% yield of triethyl phosphate was obtained based on the P₂O₅ used.

Example 14

A well-agitated autoclave was charged with a mixture of 4200 pounds of ether, 600 pounds of P₂O₅ and 5 pounds of orthophosphoric acid (100%). The mass was heated to a temperature of approximately 150° C. and was maintained at that temperature for 48 hours accompanied by agitation. After removal of the ether at atmospheric pressure, the mass was vacuum distilled to obtain the triethyl phosphate. 870 pounds of triethyl phosphate was obtained, being a yield of 56% based on the P₂O₅ used.

Example 15

This example illustrates the preparing of triethyl phosphate in which a non-reactive solvent is employed.

A well-agitated autoclave was charged with 100 grams of benzene, 103 grams of P₂O₅ and 200 grams of ether. The mass was heated to 150° C. and maintained at this temperature for 4 hours. The mass was then cooled, the excess ether removed by atmospheric distillation and then vacuum distilled to obtain triethyl phosphate. A 51% yield of triethyl phosphate was obtained based on the P₂O₅ used.

In the examples the small amounts of additional material employed such as iodine, ferric chloride, sulfuric acid, phosphoric acid, cobaltous acetate and the like were for the purpose of catalyzing the reaction. When a catalyst was employed, it was found that the yields were greater than without the use of a catalyst.

In the examples other ethers may be substituted for those listed, depending upon the types of products desired. For instance, instead of ethyl ether, diphenyl ether might be employed. In that case and with the temperatures specified the use of an autoclave would not be ordinarily necessary. The time of reaction obviously depends upon the severity of the conditions employed and the use of a catalyst to promote the reaction. As there is no disadvantage in a prolonged reaction time, it is desirable to carry out the procedure for several hours to obtain maximum yields.

It is thought that the process of our invention goes through intermediate stages and hence the preparation of triethyl phosphate starting with intermediate phosphorus compounds also is within the scope of our invention. Some of the reactions which are thought to occur to a more or less extent in a process in accordance with our invention are as follows:

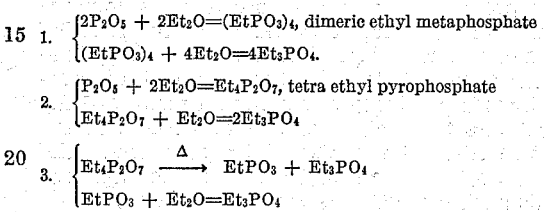

In making neutral esters of phosphoric acid, it may be desirable to first make intermediate products such as meta phosphates or pyrophosphates by a method taught in the prior art and then react those intermediate products with ether to obtain a neutral ester of orthophosphoric acid. Another source of these intermediate products is the residue from the carrying out of a process in accordance with our invention. All of the equations given are for equilibrium reactions and it is unusual to have the reaction for the formation of triethyl phosphate go wholly to completion. The residue which contains either ethyl metaphosphate, tetraethyl pyrophosphate or both is mixed in with the reaction materials or if desired reacted with an ether to form the neutral ester of the orthophosphoric acid.

The following examples illustrate the preparation of triethyl phosphate using a meta-phosphate or a pyrophosphate as the starting material.

Example 16

A well agitated autoclave was charged with a mixture of 200 grams of diethyl ether and 99 grams of ethyl meta-phosphate. The reaction was run for 4 hours with an average temperature of 140° C. the average pressure being 275 pounds. The excess ether was removed from the mass by distillation and atmospheric pressure and the mass was then subjected to vacuum distillation. 86.6 grams of triethyl phosphate was obtained which amounts to a yield of 52% based on the ethyl-m-phosphate used.

Example 17

A well-agitated autoclave was charged with a mixture of 100 grams of tetraethylpyrophosphate and 300 grams of diethyl ether. The reaction was run for 8 hours at a temperature of approximately 140° C. The pressure over the course of the reaction was in the vicinity of 280 pounds. The mass was then subjected to distillation at atmospheric pressure for a time sufficient to remove the excess ether present. The triethyl phosphate formed was recovered by vacuum distillation. 74 grams of triethyl phosphate was obtained amounting to a yield of 59% based on the tetraethylpyrophosphate employed.

The neutral alkyl and aryl esters of phosphoric acid prepared in accordance with our invention may be employed for various purposes such as plasticizers, spinning lubricants, antistatic agents, catalysts, surface active agents, or any other connection in which those materials are useful. The virtue in the method which we have described is that less expensive starting materials are used, the yields are good and the esters are produced in a more pure state and more economically than by any of the previous methods disclosed. Ordinarily redistillation or washing with caustic alkali is unnecessary in refining the esters prepared in accordance with our process, and which are removed from the reaction mixture by vacuum distillation, as has been ordinarily found necessary with esters of this type prepared by other methods.

In preparing esters in accordance with our invention, it is desirable to carry out the reaction for a considerable time. Although the time of reaction is not critical, we have found that ordinarily it is necessary to employ a time of at least five hours to obtain a satisfactory reaction, except in cases of the highest temperatures. The sole criterion as to time is that the reaction proceeds until the $P_2O_5$ has reacted to a point wherein a good yield of product is obtained.

We claim:

1. The method of preparing triethyl phosphate which comprises reacting phosphorus pentoxide with diethyl ether in excess at a temperature of 65°–180° C. under autogenic pressure for a sufficient time to cause the formation of a substantial proportion of triethyl phosphate.

2. A method of preparing triethyl phosphate which comprises reacting phosphorus pentoxide with diethyl ether in excess at a temperature of 120°–160° C. under autogenic pressure for a sufficient time to obtain a substantial amount of triethyl phosphate thereby.

3. A method of preparing triethyl phosphate which comprises reacting phosphorus pentoxide with diethyl ether in excess at a temperature of 65°–180° C. under autogenic pressure for a sufficient time to result in a substantial amount of triethyl phosphate followed by separation of the triethyl phosphate from the mass by vacuum distillation.

4. A method of preparing triethyl phosphate which comprises reacting phosphorus pentoxide with diethyl ether in excess at a temperature of 65–180° C. under autogenic pressure for a sufficient time to give a substantial amount of triethyl phosphate, removing the unreacted ether by atmospheric distillation, subjecting the mass to vacuum distillation whereby the triethyl phosphate is obtained, mixing the residue from the vacuum distillation with diethyl ether in excess and again subjecting to the temperature of 65°–180° C. under autogenic pressure to obtain a further amount of triethyl phosphate.

5. A method of preparing triethyl phosphate which comprises reacting phosphorus pentoxide with diethyl ether in excess at 65°–180° C. under autogenic pressure, removing the triethyl phosphate from the mass and repeatedly heating the residue obtained with diethyl ether so as to obtain additional amounts of triethyl phosphate.

6. A method of preparing triethyl phosphate which comprises mixing one part of phosphorus pentoxide with at least two parts of diethyl ether and maintaining the mass at a temperature of 65°–180° C. under autogenic pressure until a substantial amount of triethyl phosphate is obtained.

7. A method of preparing triethyl phosphate which comprises mixing one part of phosphorus pentoxide with 8 to 10 parts of diethyl ether and subjecting the mass to a temperature of 120°–180° C. under autogenic pressure for a sufficient time to obtain a substantial amount of triethyl phosphate.

8. A method of preparing triethyl phosphate which comprises mixing one part of phosphorus pentoxide with 8 to 10 parts of diethyl ether and subjecting the mass to a temperature of 120°–180° C. under autogenic pressure for a sufficient time to obtain a substantial amount of triethyl phosphate and then subjecting the mass to vacuum distillation so as to remove triethyl phosphate from the mass.

9. A method of preparing triethyl phosphate which comprises mixing together phosphorus pentoxide, diethyl ether in excess, and an inert organic solvent and maintaining the mass at a temperature of 65°–180° C. under autogenic pressure for a sufficient time to result in a substantial proportion of triethyl phosphate.

10. A method of preparing triethyl phosphate which comprises mixing together phosphorus pentoxide, diethyl ether in excess and an esterification catalyst, and subjecting the mass to a temperature of 65°–180° C. under autogenic pressure for a sufficient time to result in a substantial proportion of triethyl phosphate.

11. A method of preparing triethylphosphate which comprises reacting ethyl-meta-phosphate with diethyl ether in excess at a temperature of 65–180° C. under autogenic pressure for a sufficient time to cause the formation of a substantial proportion of triethyl phosphate.

12. The method of preparing triethyl phosphate which comprises reacting tetraethylpyrophosphate with diethyl ether in excess at a temperature of 65–180° C. under autogenic pressure for a sufficient time to cause the formation of a substantial proportion of triethyl phosphate.

DAVID C. HULL.
JERRY R. SNODGRASS.